United States Patent Office

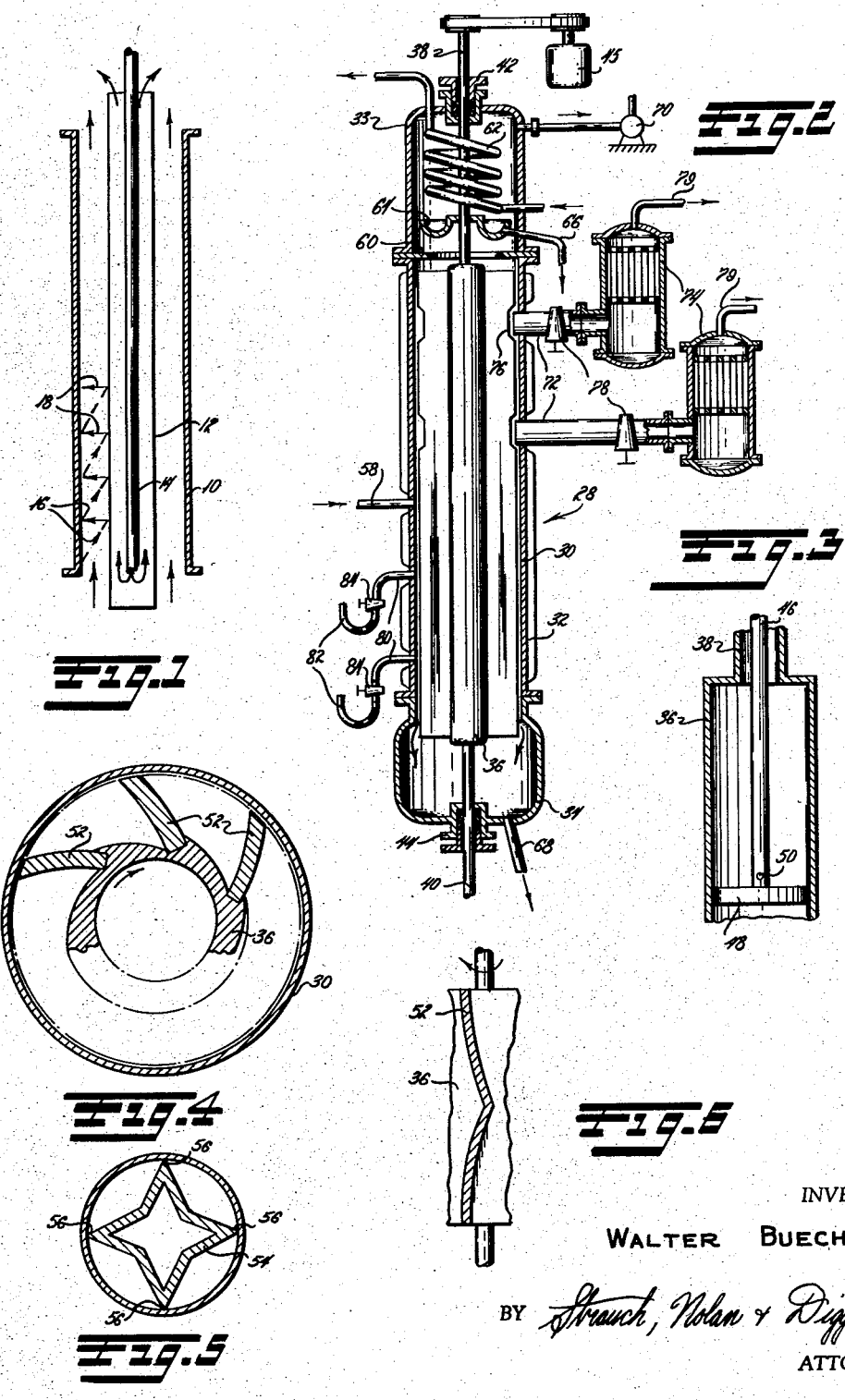

2,848,388
Patented Aug. 19, 1958

2,848,388

APPARATUS FOR THE RECTIFICATION OF MULTICOMPONENT MIXTURES

Walter Bueche, Ludwigshafen (Rhine), Germany

Application August 27, 1954, Serial No. 452,642

7 Claims. (Cl. 202—205)

This invention relates to methods and apparatus for the rectification of multicomponent mixtures.

Mixtures of liquids having different boiling points can be conveniently separated by rectification or distillation but when one or more of the liquids is sensitive to temperature, the distillation must be carried out at reduced pressures. When the individual components of the mixture have boiling points which differ sufficiently that their recovery in the pure state is possible by fractional distillation, there is normally no difficulty in principle in lowering the pressure sufficiently to depress the boiling points to a range within which the temperature sensitive fractions are not decomposed or damaged.

When the liquids to be separated have close boiling points and one or more of the liquids is temperature sensitive, new and more difficult problems arise. Because of the close boiling points, rectification is necessary for satisfactory separation and in order to prevent damage or decomposition of the temperature sensitive liquid, it is necessary to carry out the rectification at low pressures. Preferably there should be a very small hold-up of liquid within the apparatus to prevent burning and there should be only a small pressure variation from one end of the apparatus to the other since any increase in pressure necessitates an increase in temperature which may injure or decompose the temperature sensitive components. There should also be very intimate contact between the vapor and liquid during rectification and for economical operation, the through-put speed should be high.

Rectification can be carried out at low pressures in bubble-cap, plate and packed columns but each of these columns has certain inherent and well known deficiencies. In each of these columns there is a substantial amount of liquid held up within the column and subjected to the vaporizing temperature. In the bubble-cap and plate columns there is a pressure drop at each plate and in packed columns there is considerable flow resistance which increases greatly with through-put speed so that in each type there is ordinarily a substantial variation in pressure from one end of the column to the other. Due to this pressure variation, the vaporizing temperature in at least part of the column may be so high as to injure a temperature sensitive liquid. Packed columns are also subject to channeling of the vapor through the packing so that the theoretical vapor enrichment may not be realized and bubble-cap and plate columns require the most careful and precise positioning for maximum efficiency and uniform results.

Other systems such as that shown in Patent No. 2,606,-146 avoid some of the defects of the bubble-cap, plate and packed columns but present other difficulties. For example, in the system of Patent No. 2,606,146, there is nothing to insure complete and intimate contact between the liquid and vapor and nothing to prevent entrainment of droplets of liquid in the vapor.

I have found that all of the foregoing difficulties can be overcome and that heat sensitive liquids can be rectified continuously at sufficiently low pressures and temperatures that heat sensitive liquids are not injured or decomposed. I have also found that the liquid mixtures can be rectified continuously without substantial pressure variations during the processing and with only small quantities of liquid being held up within the apparatus.

One of the objects of the present invention is to provide a new method and apparatus for rectifying liquid mixtures.

Another object is to provide a new method and apparatus for rectifying temperature sensitive liquid mixtures at low pressures.

Another object is to provide an improved apparatus for rectifying liquid mixtures in which only a small amount of liquid is present in the apparatus at any given time.

Another object is to provide an improved apparatus for rectifying liquid mixtures in which the mixture is continuously evaporated and the vapor continuously condensed while maintaining the liquid and vapor in intimate turbulent contact.

Another object is to provide rectification apparatus in which entrainment of reflux in the vapor is prevented.

These and other objects and advantages reside in certain novel features of construction and arrangement and in steps and operations as will hereinafter be more fully set forth and pointed out in the appended claims.

Figure 1 is a diagrammatic vertical section illustrating the operation of the present invention.

Figure 2 is a vertical sectional view of one form of apparatus embodying the present invention.

Figure 3 is an enlarged fragmentary vertical section of the rotor.

Figure 4 is a horizontal section of one form of rotor.

Figure 5 is a horizontal section of another form of rotor.

Figure 6 is a fragmentary view of a modified form of rotor.

The operation of the present invention is illustrated diagrammatically in Figure 1. The apparatus consists essentially of a substantially vertical heated cylindrical or conical wall 10 and a coaxial hollow member 12 within which is a pipe or conduit 14 through which a cooling gas or liquid as introduced to cool the wall of the member 12. Liquid flows down the wall 10 by gravity and is normally removed at the bottom of the apparatus while vapor passes upward between the wall 10 and member 12 and is normally removed at the top of the apparatus.

The liquid flowing down the heated wall 10 is evaporated and the vapor contacting the cooled member 12 is condensed. In order to return the condensate formed on the member 12 to the wall 10 the member 12 is rotated and the condensate returned to the heated wall 10 by centrifugal force. The arrows 16 indicate the flow of vapor from the heated wall 10 to the member 12 and the arrows 18 indicate the return of condensate or reflux from the member 12 to the wall 10. Thus the descending liquid becomes more and more enriched with the higher boiling components and the rising vapor becomes more and more enriched with the lower boiling components.

The vapor normally moves through the apparatus at a relatively high velocity and, for effective and efficient separation it is necessary to prevent droplets of condensate returning from the member 12 to the wall 10 from being entrained in the vapor. Various known expedients for directing liquid outward from a rotor are unsatisfactory in the present apparatus. As will be pointed out, in the present invention, the apparatus is designed so that the condensate is returned from the rotor 12 to the wall 10 substantially without formation of droplets and without substantially impeding the flow of the vapor.

A preferred form of apparatus embodying the present invention is illustrated in Figure 2 and comprises a substantially vertical chamber indicated generally at 28 having a wall 30 which may be either cylindrical or conical. The wall 30 is provided with one or more suitable heating means such as a steam jacket 32. The chamber 28 is closed at its upper end by a cap or bell 33 and at its lower end by a liquid chamber 34.

Within and coaxial with the chamber 28 is a hollow rotor 36 which is carried by shafts 38 and 40 journalled respectively in suitable pressure-sealed bearings 42 and 44 in the cap 33 and chamber 34 respectively. The rotor is rotated by a suitable motor or engine 45 and is provided with blades or vanes which extend outward into close proximity to the wall 30 as will hereafter be described. In general, the rotational speeds and vane clearances used in known thin-film evaporators are satisfactory in the present apparatus.

As shown in Figure 3, the shaft 38 is hollow and a pipe 46 extends down through the shaft 38 into the rotor 36 and carries at its lower end a plate or disk 48 which engages the inner wall of the hollow rotor 36. The pipe 46 has one or more openings 50 at its lower end near the disk 48 and cooling gas or liquid may be introduced into the rotor 36 through the pipe 46 and returned through the hollow shaft 38. Raising or lowering the pipe 46 and disk 48 by suitable means not shown decreases or increased the cooled portion of the rotor 36.

When any portion of the surface of the rotor including the vanes is at a right angle to the radius of the rotor, that is, is cylindrical about the rotor axis, vapor condensed on that portion will tend to remain on the surface until it forms droplets sufficiently large that centrifugal force will pull the droplets away from the rotor surface and throw them outward toward the heated chamber wall. Due to the movement of the vapor and the small size of the droplets, the small droplets of condensed liquid may be carried along with the vapor and thus contaminate the vapor.

I have found that this difficulty may be overcome by forming the rotor and vane surfaces so that they form an angle other than a right angle with the radius of the rotor. Due to this surface formation, the condensate does not collect until it is thrown off as droplets but moves along the surface in a thin film as it is formed.

In the modification shown in Figure 4 relatively thick blades or vanes 52 are attached to the rotor 36 in a heat-conducting fashion so that the vanes also serve as cooling surfaces. The curvatures of the outer surface of the rotor and the surfaces of the blades or vanes are chosen so that the angle between the radius and the tangent to the surface differs from 90° at all points. As a result, all particles of condensate, as soon as they are formed, are spread out on the cooled surfaces and move along the cooled surface in the form of a film sliding on the surface towards the cylinder wall where they unite with the boiling liquid.

In the modification shown in Figure 5, the rotor 54 is hollow and of star shape in cross section, the points 56 of the star corresponding to vanes. The coolant flowing through the rotor 54 thus cools the projecting points or vanes directly rather than by conduction as in Figure 4 and the surfaces of the rotor 54 do not intersect the radius at a right angle at any point.

The liquid to be recitified is introduced into the chamber 28 through an inlet 58 which is spaced from the ends of the chamber 28. As the liquid flows down the wall 30, it is spread out into a thin film by the vanes of the rotor 36 in the same manner as in known thin-film evaporators.

The descending liquid is evaporated by heat from the jacket 32 and the vapor rises until it is condensed by contact with the cooled rotor or vanes. The liquid condensate is thrown outward by centrifugal force to the heated wall 30 where it is reevaporated. Above the inlet 58, the liquid on the wall 30 is all reflux and this descending film of liquid reflux mixes with the incoming liquid and both flow together down the wall 30. During the entire operation, both the liquid and vapor are subject to the agitating and centrifugal action of the vanes so that the most intimate contact between liquid and vapor is assured while there is sufficient free space within the chamber 28 between the vanes that the flow of vapor is not substantially impeded and there is no substantial pressure variation through the chamber.

An inwardly projecting flange or shoulder 60 is provided between the chamber 28 and the cap 33 to prevent the upward passage of liquid reflux so that only rectified vapor enters the cap. The rectified vapor may be withdrawn from the cap and condensed separately or may be condensed within the cap as shown. If the vapor is to be condensed within the cap 33, a suitable condensing coil 62 is mounted in the cap 33 and a trough or tray 64 is positioned below the coil 62 to receive the concentrate. The condensed vapor may be withdrawn through an outlet 66.

The high boiling liquid fraction flows down the wall 30 into the liquid chamber 34 from which it may be withdrawn through an outlet 68. If desired, the liquid chamber 34 and outlet 68 may be heated by suitable means not shown in order to maintain the fluidity of the high boiling fraction.

The entire unit may be kept at any desired pressure by a suitable vacuum pump 70.

By adjusting the position of the disk 48 and pipe 46 longitudinally of the rotor 36, different effects can be obtained. For example, when the disk 48 is not below the inlet 58, the portion of the apparatus below the inlet functions only as an evaporator. This pure evaporator function may be of great importance when the low boiling liquid has high viscosity at low temperatures. When the disk is positioned below the inlet 58, the portion of the apparatus between the inlet and the disk 48 functions as a separator to remove unevaporated droplets of liquid from the vapor. Above the disk 48, the apparatus functions to rectify the liquid and vapor as described.

The rotor including the vanes is formed so that there is sufficient free space within the chamber as not to impede the vapor substantially even at high vapor and rotor speeds. The rotation of the vanes urges the vapor outward by centrifugal force while keeping the liquid spread in a thin turbulent film on the chamber wall. During operation the liquid mixture and reflux flowing down the chamber wall, the condensate coming from the rotor and the vapor are thoroughly agitated together in a thin film so that there is maximum intimate surface contact between vapor and liquid. Because of this intimate turbulent contact, there is maximum enrichment of the vapor with the low boiling fraction and maximum enrichment of the liquid with the high boiling fraction.

By reason of the centrifugal force acting in the annular gap, the vapor at the cylinder wall has a higher pressure than at the rotor surface. When using vanes parallel to the axis there are therefore formed in some cases secondary flows which are directed in the vicinity of the cylinder wall from the central plane of the chamber towards the two ends and in the vicinity of the rotor from the two ends inward towards the central plane. These secondary flows become superposed on the main flow and cause an undesirable mixing effect which can be reduced or eliminated by using vanes which are inclined outwardly from the center to the ends of the rotor in the direction of rotation. Figure 6 shows, by way of example, the course of the outer edge 52 of a single blade which, starting from the central plane, is twisted in the form of a spiral surface towards both ends in the direction of rotation.

Apparatus of the said kind are preferably used in the separation of liquids which permit only very low boiling pressures by reason of their sensitivity to temperature. They can also be used, however, for working at high pressures when the use of the conventional rectification apparatus is impossible for certain reasons, as for example by reason of the formation of deposits of suspended solids. The apparatus for the separation of two-component mixtures is especially simple because only one single condenser 62, directly attached to the heated cylinder 28, is necessary and it is unnecessary to provide a special still for the vaporisation.

When the liquid mixture to be rectified contains more than two components, the temperatures and pressures may be regulated so that only the most volatile fraction enters the cap or bell 33. Slightly less volatile components will reach a vaporization-condensation equilibrium above the inlet 58 below the top of the chamber 28. At such an equilibrium point, the vapor will become more and more enriched with the particular component and theoretically that component will be contaminated only with the passing vapor of the more volatile component.

Fractions rich in a particular component can be drawn off through one or more conduits 72 and condensed in condensers 74. The conduits 72 extend into the chamber 28 by an amount greater than the thickness of the film of reflux liquid to prevent contamination of the withdrawn vapor component and the vanes are notched as shown at 76 to clear the projecting ends of the conduits 72. The condensers 74 may be connected to the vacuum pump 70 or to a separate vacuum pump by conduits 79. Valves 78 control the amount of vapor withdrawn.

A similar equilibrium is reached in the liquid phase below the inlet 58 and liquid rich in particular components may be withdrawn through one or more conduits 80 and siphons indicated at 82. Valves 84 control the amount of liquid withdrawn. Since the liquid is flowing along the wall of the chamber 28, the openings of the conduits 80 are flush with the inner surface of the wall and there is no need to notch the vanes.

In the embodiment shown in Figure 2, the chamber 28 is heated throughout its length by a single steam jacket. It is apparent however, that separate heating means may be spaced longitudinally along the length of the chamber 28 and different portions of the chamber heated to a different extent. For example, if the least volatile component becomes viscous at low temperatures, the lower portion of the chamber 28 may be heated to a greater extent to keep the least volatile component fluid while the upper portion of the chamber 28 may be kept at a temperature just sufficient to maintain the proper vapor conditions.

From the foregoing it is apparent that I am able to attain the objects of my invention and provide new methods and apparatus for rectifying liquids especially heat sensitive liquids. During the processing, the liquids are protected both from excessive temperature and from being subjected to elevated temperature for any considerable period of time. Intimate liquid-vapor contact is maintained and contamination of vapor with less volatile components is prevented.

This application is a continuation in part of my application Serial No. 269,985, filed February 5, 1952, now abandoned.

The embodiments disclosed are illustrative and it is apparent that various modifications can be made without departing from the spirit of my invention or the scope of the appended claims.

I claim:

1. In apparatus for the rectification of mixed liquids, a heated cylindrical chamber; a rotor construction for spreading said liquids in a thin film on the inner wall of said chamber comprising, a rotor having a central passage for coolant and an imperforate non-cylindrical external surface; and a plurality of heat conducting blades on said rotor extending outwardly therefrom to points closely adjacent said wall, the external surface of the rotor construction defined by the rotor and the blades being such that a tangent at any point on said surface is oblique with respect to a radius drawn to said point whereby the liquid slides in a thin film along said external surface without the formation of droplets.

2. Apparatus for separating liquids of different boiling points from a mixture of such liquids, comprising a wall forming a substantially vertical tubular chamber of circular cross section, means for heating said wall to a temperature above the boiling point of the liquid having the lower boiling point, means for introducing the liquid mixture into the chamber above the lower end of the chamber for gravity flow toward the lower end of said chamber, a hollow rotor mounted within and coaxially of said chamber, means for rotating said rotor, means for spreading the liquid in a thin turbulent film on said wall whereby all components are intermixed, and means for preventing free passage of vapor through said chamber, said latter two means comprising vanes on said rotor extending outwardly into close proximity to said wall and means for cooling said rotor and said vanes below the boiling point of the liquid by passing a cooling fluid through said hollow rotor.

3. Apparatus as defined in claim 2 including means for varying at will the cooled portion of the rotor to portions above and alternatively to portions below said means for introducing the liquid mixture into the chamber.

4. Apparatus as defined in claim 2 including a compartment at the top of the chamber, and means in said compartment for condensing the vapor of the liquid having the lower boiling point.

5. Apparatus as defined in claim 4 including means for preventing unevaporated liquid from entering said compartment.

6. The combination in accordance with claim 2 wherein said vanes extend outwardly from said rotor at an obtuse angle with respect to said rotor substantially greater than 90 degrees.

7. The combination in accordance with claim 6 wherein the distance of the rotor surface from the center of said rotor decreases between blades in the direction of rotation of said rotor.

References Cited in the file of this patent

UNITED STATES PATENTS

| | | |
|---|---|---|
| 2,370,464 | Hickman | Feb. 27, 1945 |
| 2,383,945 | Shantz | Sept. 4, 1945 |
| 2,455,059 | Hickman | Nov. 30, 1948 |
| 2,546,380 | Zahm | Mar. 27, 1951 |
| 2,562,153 | Taylor | July 24, 1951 |
| 2,606,146 | Luten | Aug. 5, 1952 |
| 2,609,335 | Hickman | Sept. 2, 1952 |
| 2,751,338 | Schwemberger | June 19, 1956 |

FOREIGN PATENTS

| | | |
|---|---|---|
| 308,727 | Great Britain | Mar. 25, 1929 |